May 9, 1967  R. G. PLAISTED  3,318,124
WORKPIECE SHAPE CONTROL
Filed Dec. 10, 1964  6 Sheets-Sheet 1

WITNESSES:
Bernard R. Gregory
James F. Young

INVENTOR
Richard G. Plaisted
BY R. G. Brodahl
ATTORNEY

May 9, 1967  R. G. PLAISTED  3,318,124
WORKPIECE SHAPE CONTROL
Filed Dec. 10, 1964  6 Sheets-Sheet 2

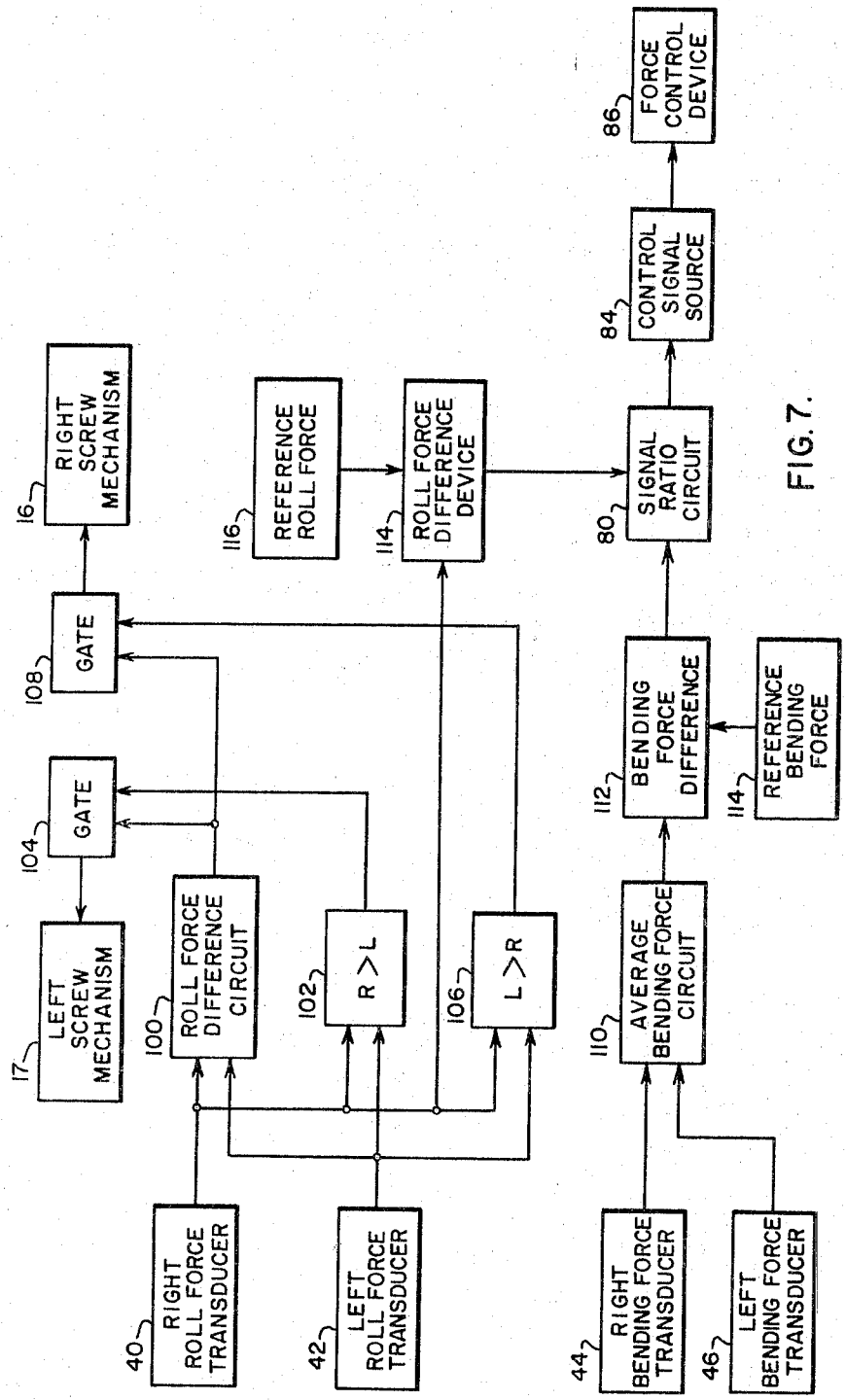

United States Patent Office 3,318,124
Patented May 9, 1967

---

3,318,124
WORKPIECE SHAPE CONTROL
Richard G. Plaisted, Pittsburgh, Pa., assignor to Westinghouse Electric Corporation, Pittsburgh, Pa., a corporation of Pennsylvania
Filed Dec. 10, 1964, Ser. No. 417,323
13 Claims. (Cl. 72—8)

The present invention relates in general to the control of workpiece strip shape leaving a rolling mill, and more particularly to the control of the roll shape in an effort to determine the roll workpiece strip shape.

It has been known in the prior art to grind the work rolls of a rolling mill to have a predetermined amount of crown, such that as the screwdown force is applied the attendant bending of the work rolls will result in a rolled strip having substantially parallel top and bottom surfaces or preferably having a small amount of camber in the workpiece strip shape to be introduced to give a proper tracking of the workpiece strip through the rolling mill. It has also been known in the prior art to vary the shape of rolled strip by a force applied between the work rolls with hydraulic or other suitable force means either to effect a bending of the rolls themselves or by positional adjustment of one or more of the work rolls in the direction of the strip movement.

It is an object of the present invention to provide improved workpiece shape or thickness control operative such that the effects of undesired roll shape are better and more accurately corrected.

It is a different object to provide improved workpiece shape control operative with a workpiece rolling mill to better control the delivery workpiece shape relative to a desired workpiece shape.

It is an additional object of the present invention to provide improved workpiece shape or profile control apparatus and method for better controlling the work roll shape and to reduce the required changes of the rolls in relation to the desired work strip flatness by permitting a given roll to be used for a greater variety of work strip parameters.

The present invention involves both apparatus and method for automatically regulating the delivery workpiece strip shape by controlling the shape or bending of the work roll to compensate for operational factors such as the width and thickness of the strip, the desired reduction, the alloy material, the temperature of the mill and of the workpiece and the operation speed of the mill by applying a counteraction bending force to the work rolls such that there results a correction in the measured shape error of the workpiece strip.

Further objects and advantages of the present invention will become apparent from the following detailed description thereof with reference to the drawings in which.

Figure 3:
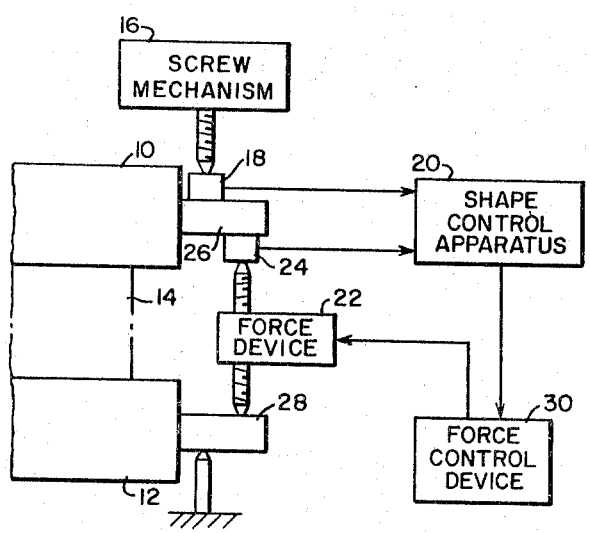

FIG. 3 diagrammatically illustrates the operation of one embodiment of the present invention.

Figure 4:
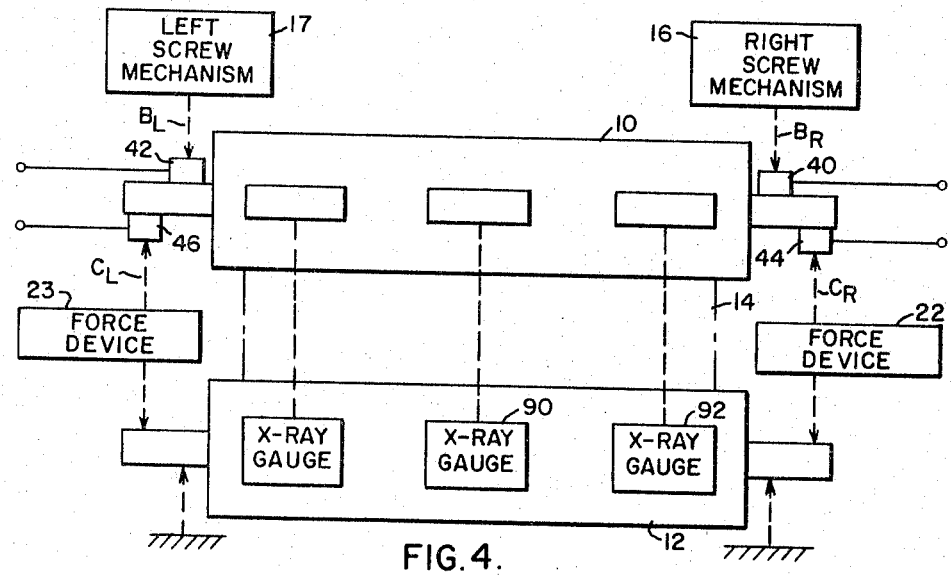

FIG. 4 shows the force sensing transducers of the present invention applied to a typical rolling mill.

Figure 5:
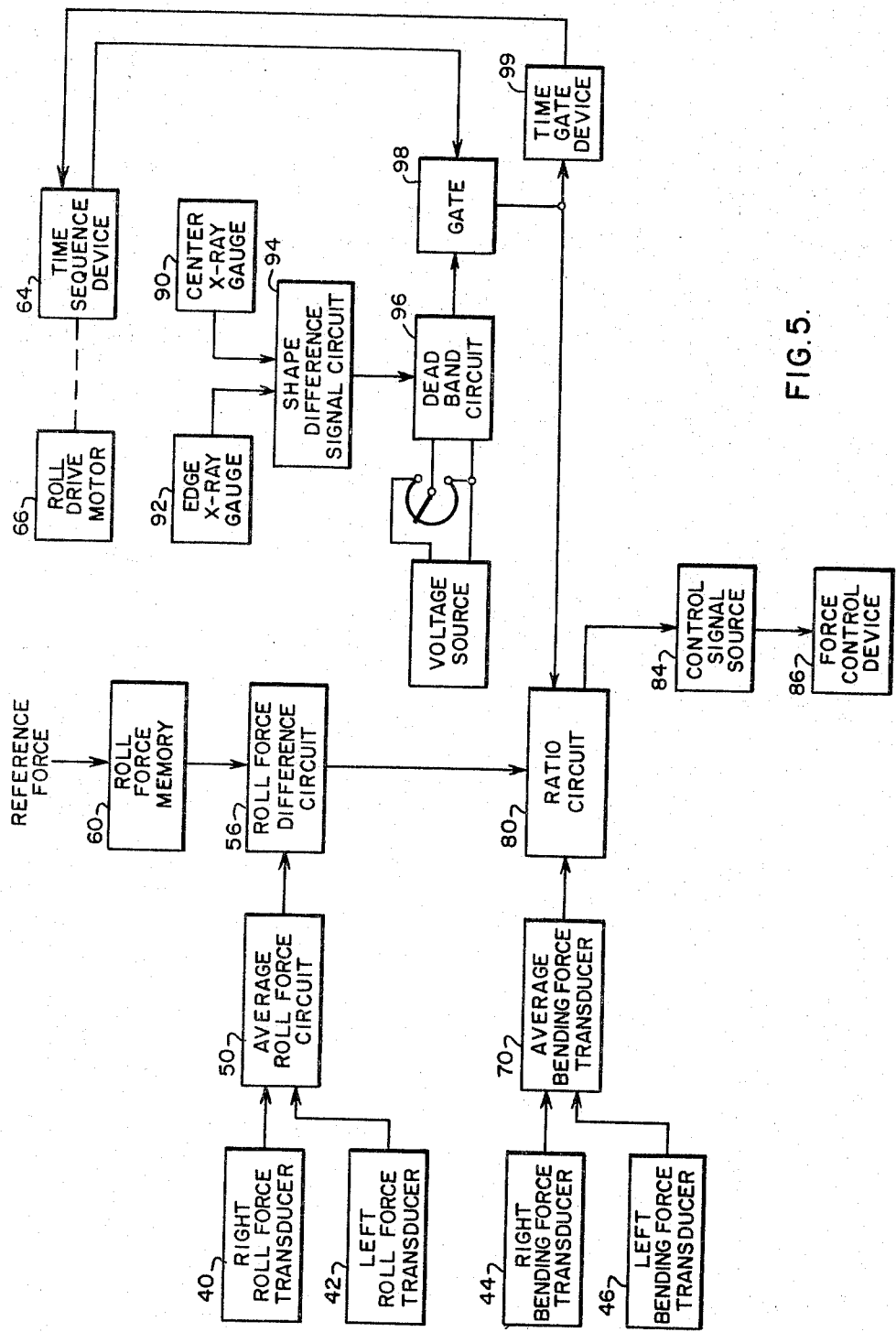

FIG. 5 is a schematic diagram of one embodiment of the control apparatus in accordance with the present invention.

Figure 6:
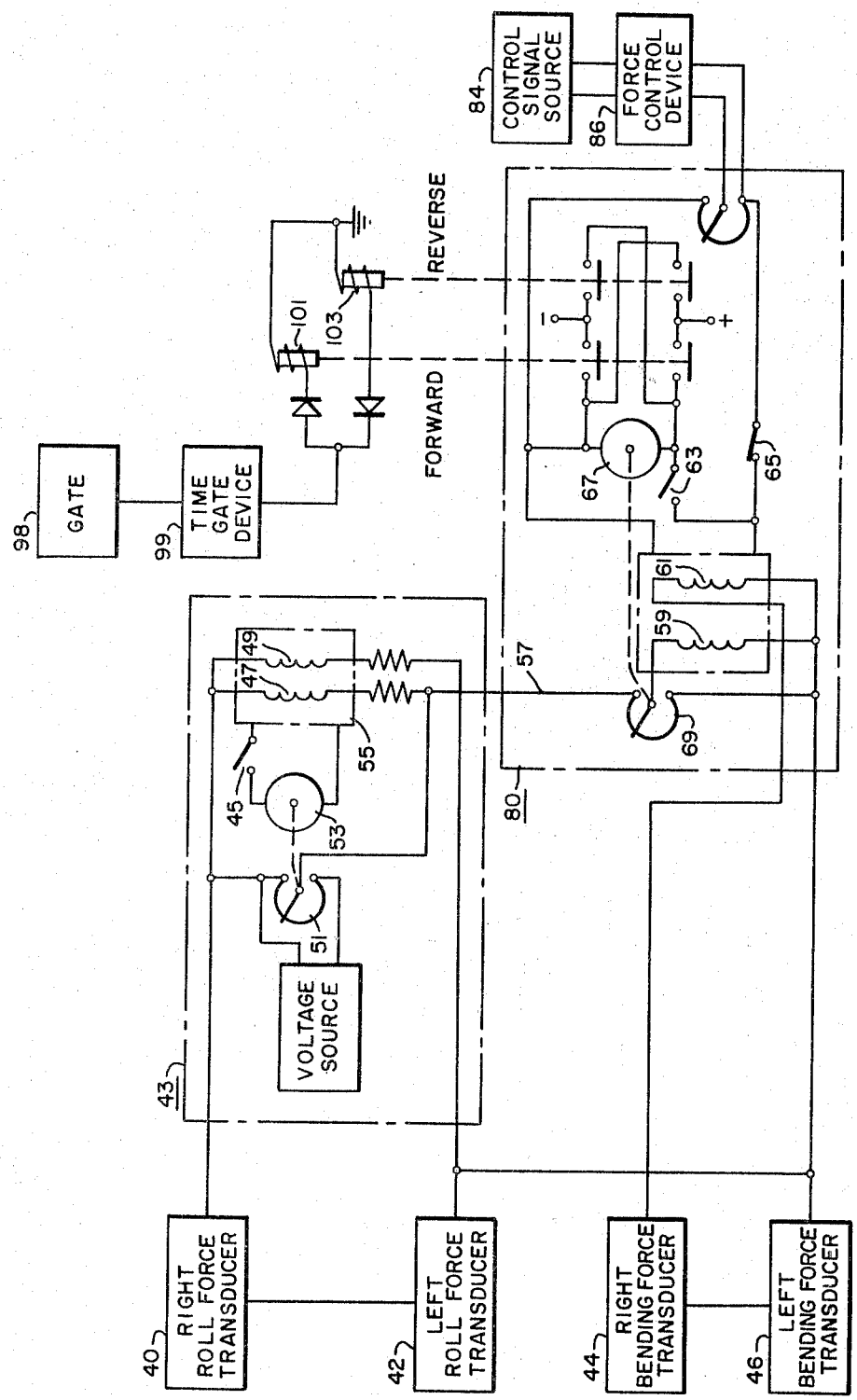

FIG. 6 is a schematic showing of a different embodiment of the present control apparatus.

FIG. 7 is a diagrammatic showing of a still further embodiment of the present invention.

Figure 8:
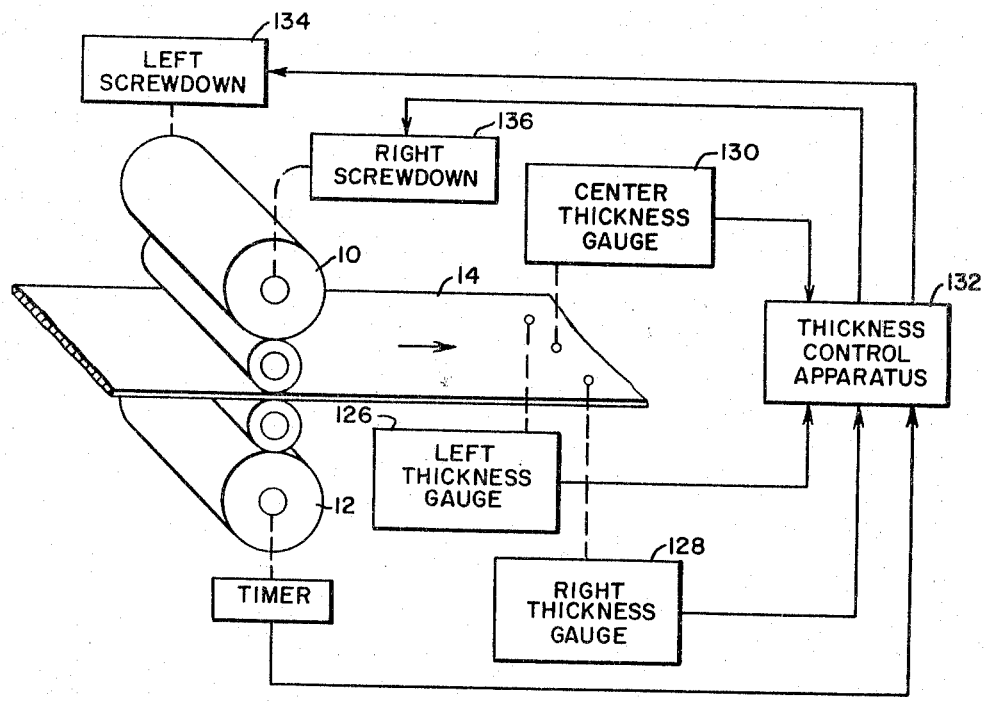

FIG. 8 is a diagrammatic showing of suitable prior art control apparatus for leveling the rolls of a rolling mill.

Figure 9:
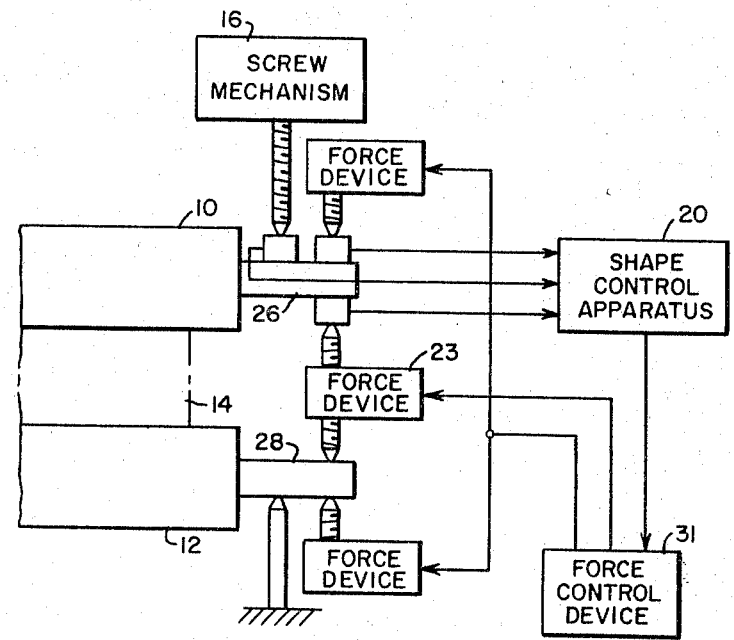
Figure 10:
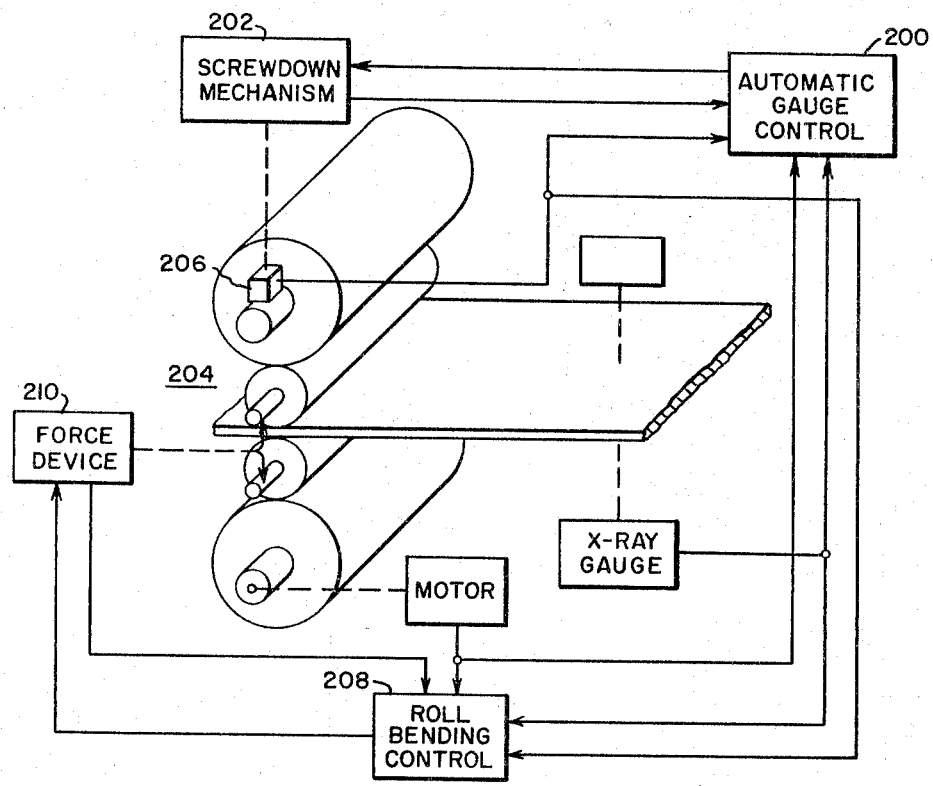

FIG. 9 illustrates the operation of an additional embodiment of the present invention, and FIGURE 10 generaly shows the relationship between a conventional gauge control system and the roll bending control of the present invention.

Figure 1:
FIGURE 1 is a cross sectional showing of a typical roll member.

In FIGURE 1 there is shown a typical roll member for a rolling mill which is ground to have a larger diameter at the center as compared to the ends of the roll. This is called a crowned roll and is utilized for uniformly reducing the entering cross section of the workpiece strip during a rolling operation.

Figure 2:
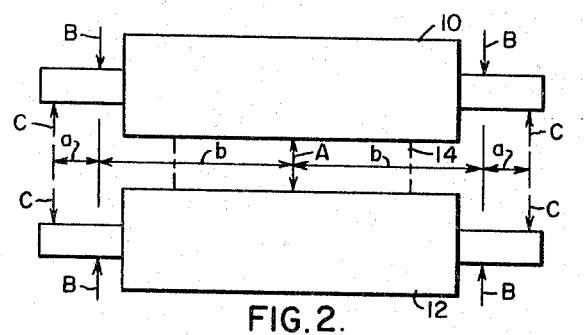
FIG. 2 illustrates the involved forces with the present invention when a workpiece passes between the rolls of a rolling mill.

In FIGURE 2 there is generally shown an upper roll 10 and a lower roll 12 having applied suitable screwdown mechanism forces B to the ends of the rolls. A force A is effectively applied to the center of the rolls 10 and 12 due to the compression of the workpiece 14. When the workpiece 14 enters between the rolls 10 and 12 of the rolling mill, the separating forces due to the reduction of the workpiece 14 are distributed along the faces of the respective rolls, 10 and 12. Equilibrium of metal reduction and roll deflection results in more deflection of the rolls 10 and 12, and consequently less reduction of the workpiece strip, at the center of the workpiece strip 14 as compared to the edges of the workpiece strip 14. The summation of all the distributed forces could be represented relative to the resultant roll bending, by a composite force A shown in FIGURE 2 at a distance $b$ from the screw mechanism center line and screwdown force B. To restore the center of the rolls 10 and 12 to a shape such that their respective faces are substantially parallel throughout the width of the workpiece strip 14 would require a bending force C applied at some distance $a$ from the center line from the screw mechanism. Since only the forces B and C can be conveniently measured, it is desirable to establish a predetermined relationship between forces B and C to provide the desired workpiece shape and flat roll surfaces under operational rolling conditions.

It is important that the delivery shape of rolled strip from hot mills and from cold mills be controlled in reference to shape and flatness. The reduction in thickness should be as desired across the whole width of the strip. The provision of a predetermined crown to the rolls is generally proper for one set of rolling conditions only, and this requires costly roll changes and a considerable supply of available and varied crowned rolls to enable a given rolling mill to properly roll a variety of workpiece sizes. The effective crown of any given roll can be varied by controlled bending of the roll during the actual rolling mill operation, and this can be done to provide a greater crowned shape to the working roll or a lesser crowned shape, by applying suitable bending forces to the work rolls or to the back up rolls as may be preferred. It is contemplated that a crown change of several thousandths of an inch can be provided this way. This will enable a given roll to be proper for a greater variety of workpiece dimensions without the necessity of roll changes for that purpose. It should be additionally noted that thermally induced crown changes within the roll require correction, and this can be accomplished by the teachings of the present invention.

A plurality of equations can be evolved in accordance with the force equilibrium conditions shown in FIGURE 2:

(1)       $2C = (b/a)A$
(2)       $2B = A + 2C$
(3)       $A = (a/b)2C$
(4)       $2B = (a/b)2C + 2C$
(5)       $B = C(1 + a/b)$

The above equations show that in order to restore the work rolls to a substantially flat contour, it is necessary that bending force C be regulated to a fixed ratio relative to screwdown force B, with this ratio to depend upon the width of the strip. In actual practice the work rolls are not desired flat but instead are contoured to have a larger diameter in the center than at the edges to compensate for the inherent roll bending due to the applied reduction forces and to present a substantially flat surface for the right combination of desired percent reduction, metal alloy content, strip width and thickness, heat build up in the roll during the rolling and the operative speed of the mill. As a further modification of the above assumption it is not desirable for the delivery workpiece strip to be perfectly flat. A small amount of camber or increase of center thickness is desirable to maintain the proper strip tracking in the mill and for other reasons. Therefore there is a nominal value of force A which provides the correct and desired workpiece strip shape. The present roll bending control extends the variables such as drafting practice, temperature conditions, and strip width that will still permit proper delivery workpiece strip shape. Equation No. 5 above then must be modified to take into account that only the deviation from the forces which the roll shape alone should compensate for must be considered. For the purpose of the present invention, an initial desired or reference roll force is determined by a conventional automatic gauge control system, and the changes in the applied roll force relative to this reference roll force will be considered to be a $\Delta B$ control signal. A typical reference roll force signal could be calculated by a screwdown controlling computer as desired for the next pass of the work strip through a particular stand of a rolling mill, and the changes away from that reference roll force that are effected throughout the length of the work strip as it passes through the mill stand would be sensed and utilized to provide the $\Delta B$ control signal, on either a continuous basis or some predetermined incremental basis. Also, it is assumed here that at reference roll force B, there should be no requirement for a bending force C and for this reason the bending force C will be zero at reference roll force conditions, at least at the initially intended crown condition of the roll. It should be realized that for efforts to extend the effective crown range of any given roll, the reference roll force B will vary in accordance with the latter efforts. Thusly, a $\Delta C$ signal, starting from a zero value for the C signal, is the same as the actual C signal itself. Substituting $\Delta B$ for B in Equation (5) results in an equation as follows:

(6)       $\Delta B = C(1 + a/b) = c(k)$ for a desired automatic roll bending compensation the above equation shows that a fixed ratio of a relationship between $\Delta B$ to C must be maintained.

In FIGURE 3 there is illustrated one control concept of the present invention wherein the upper roll 10 and the lower roll 12 are operative with a workpiece 14 and a screw mechanism 16 applies the force B through a roll force sensing inductive device 18 to effect the desired reduction in the workpiece 14. Suitable shape control apparatus 20 is operative to sense the roll force signal provided by the inductive device 18 for controlling the bending shape of the rolls 10 and 12 as will be described. A force device 22, such as a hydraulic fluid cylinder apparatus or electric motor driven screw mechanism, is operative to supply the bending force C through an inductive force sensing device 24 to the outer end of the neck 26 of the work roll 10 and to the other end 28 of the neck of the work roll 12. The bending force C applied by the force device 22 is sensed by the inductive device 24 and a suitable signal is applied to the shape control apparatus 20. The so applied forces to the work roll 10 are compared by the shape control apparatus 20 and a suitable control signal is thereby supplied to a force control device 30 for determining the operation of the force device 22 in opposition to the screw mechanism 16.

In FIGURE 4 there are shown the upper roll 10, the lower roll 12 and the workpiece 14, with the right screw mechanism 16 supplying a roll force $B_R$ to the right end of the work roll 10 and a left screw mechanism 17 supplying a roll force $B_L$ to the other neck or left end of the work roll 10. The force device 22 applies the bending force $C_R$ to the right neck of the work roll 10 and the force device 23 applies a force $C_L$ to the left neck of the work roll 10. For determining the delivery actual shape of the workpiece strip, well known X-ray devices can be provided at a position a few feet away from the rolling mill for measuring the actual thickness of the work strip at the center and each edge of the delivery work strip.

The roll force $B_R$ applied by the right screw mechanism 16 is sensed by an inductive device 40. The roll force $B_L$ applied by the left screw mechanism 17 is sensed by an inductive force device 42. The bending force $C_R$ applied by the right bending force device 22 is sensed by an inductive device 44 and the bending force $C_L$ applied by the left bending force device 23 is sensed by an inductive force device 46.

In FIGURE 5 there is shown the right roll force transducer 40 and the left roll force transducer 42 connected to provide respective force roll signals to an average roll force circuit 50, the operation of which is to add the roll force signals from the respective transducers 40 and 42 together and to divide the sum by two. The resultant average roll force signal is supplied to a roll force difference circuit 56.

A predetermined reference roll force signal is supplied by a suitable roll force memory 60 to a second input of the roll force difference circuit 56.

The right bending force transducer 44 and the left bending force transducer 46 are connected to an average bending force circuit 70, which averages the so applied signals to supply an average bending force signal.

The output signals from the roll force difference circuit 56 and the average bending force circuit 70 are supplied to a ratio circuit 80 which in turn supplies a correction signal in accordance with a predetermined signal ratio relationship for providing the necessary bending force to be applied to the rolls for effecting the desired ratio relationship between the actual roll force deviation or difference signal $\Delta B$ and the bending force deviation or difference signal C. This bending control or roll shape correction signal is supplied to energize a control signal source 84 for determining the operation of a force control device 86.

A center position X-ray gage 90, as shown in FIGURES 4 and 5 and a strip edge position X-ray gauge 92 provide output signals to a shape difference signal circuit 94 to indicate a deviation or difference in the actual rolled strip shape as compared to a provided reference or desired rolled strip shape. The shape difference signal is connected to pass through a convention dead band circuit 96 and a gate 98, which is opened by a well known time sequence device 64, to supply this shape difference signal through the gate 98 to change or control the ratio operation of the ratio circuit 80.

In FIGURE 6 there is shown a different embodiment of the present invention, wherein right roll force transducer 40 and the left roll force transducer 42 are initially connected to a zeroing circuit 43, which is operative to provide the desired ΔB roll force signal. Initially, with the reference roll force applied to the rolls, the switch 45 is closed such that the control winding 47 operative with the right roll force transducer 40 and the control winding 49 operative with the left roll force transducer 42 will combinedly sense the difference between the setting voltage of the potentiometer 51 operated by the motor 53 and the average roll force signal. The regulator 55, which could be a magnetic amplifier device, will adjust the motor operated potentiometer 51 until the potentiometer or rheostat setting voltage balances out the average roll force signal. The switch 45 is now opened, and thereafter any changes in the actual average roll force signal, relative to the now set reference roll force signal, will be supplied through connection 57 to the winding 59 as the ΔB signal. The right bending force transducer 44 and the left bending force transducer 46 are connected to energize the winding 61 with an average C signal. At the reference roll force condition of operation, the switch 63 is initially open as is the switch 65. The manual operator now runs the rolling mill and through X-ray gauges at the center and at least one edge of the delivered work strip, the desired strip shape is obtained through manual variation of the provided roll bending force; a manual hydraulic valve control or the like can be employed for this purpose. In this manner the desired ratio between roll force changes and bending forces is established. Now the switch 63 is closed to operate the motor 67 to zero the ratio circuit 80 through adjustment of the potentiometer 69 operative with the winding 59. The motor 67 will stop when the proper zero setting is established. Now the switch 63 is opened and the switch 65 is closed, since the desired ratio is already established, there will be no output signal to the control signal source 84 until a change in the ΔB signal is sensed or a change in the C signal is sensed to require a correction change in the applied roll bending force to restore the desired feedback signal ratio relationship. As shown in FIGURES 3 and 4, the force control device 30, which can correspond to the force control device 86 shown in FIGURES 5 and 6, while increasing the bending force applied between the rolls is in effect adding to or increasing the crown of the rolls.

In FIGURE 7 there is shown a further modification of the present invention wherein the right roll force transducer 40 and the left roll force transducer 42 are connected to a roll force difference circuit 100 for providing a signal in accordance with the difference between the right roll force and the left roll force for the purpose of leveling the rolls in the mills. Each of the signals from the respective transducer 40 and 42 are applied to a first control circuit 102 which senses when the right roll force is greater than the left roll force, circuits to perform this function are well known in this art, and applies an output signal to open a gate 104 for then allowing the difference signal from the circuit 100 to be applied to the left screw mechanism 17 for increasing the left roll force as necessary to level the mill. Similarly a control circuit 106 senses when the left roll force is greater than the right roll force and then opens the gate 108 for allowing the roll force difference signal to be applied to the right screw mechanism 16 for increasing the right screwdown force for the purpose of leveling the mill. The right bending force transducer 44 and the left bending force transducer 46 are connected to an average bending force determining circuit 110, which provides an average bending force signal to a bending force difference circuit 112 in conjunction with a reference bending force signal from a circuit 114 for providing a bending force difference signal ΔC to a signal ratio circuit 80. For actual roll force applications in the order of the designed roll force for the predetermined ground crown shape of the rolls, the reference bending force signal from the circuit 114 would be zero and the signal ΔC is the same as the signal C.

The output signal from either one of the transducers 40 and 42 with the right roll force transducer 40 being chosen in FIGURE 7 is connected to a roll force difference device 115 for comparison with the reference roll force signal from a circuit 116 for providing a roll force difference signal ΔB to the signal ratio circuit 80. The control signal from the ratio circuit 80 is supplied to a control signal source 84 and a force control device 86 for applying an appropriate bending force to the rolls 10 and 12 as shown in FIGURE 4.

In FIGURE 8 there is shown a prior art roll leveling circuit in accordance with issued U.S. Patent No. 3,213,655 entitled Workpiece Shape Control Apparatus by Warren Reid and assigned to the same assignee. The control apparatus of FIGURE 8 is operative such that the left thickness gauge 126, the right thickness gauge 128 and the center thickness gauge 130 are operative to provide thickness error signals to a thickness control apparatus 132 for the purpose of determining the operation settings of the left screwdown mechanism 134 and the right screwdown mechanism 136 as necessary to level the rolls in the mills. It should be understood in this respect that if the thickness at the left edge of the workpiece is thicker than the workpiece strip thickness at the right edge of the workpiece this can be corrected by increasing the applied force from the left screwdown mechanism 134 or by decreasing the applied force from the right screwdown 146. Also as taught in this copending application, roll heating and cooling devices can be utilized where desired.

In accordance with the present invention for the purpose of providing the desired crown and workpiece strip shape as delivered from the rolling mill, the illustrated equipment will function to maintain a predetermined and desired ratio of the change in roll force signal to the change in the roll bending signal by varying the applied bending pressure such that any change in the applied roll force causes a corresponding change in the applied bending force.

As long as any given strip width remains substantially constant a change in thickness or hardness will not cause a change in strip profile within the range of the system designed.

It should be understood that a conventional roll force operative automatic strip gauge control system will work in conjunction with the illustrated control apparatus, such that the thickness of the work strip delivered from the mill is maintained substantially constant throughout its length by the provided automatic gauge control equipment and in conjunction there is additionally provided a shape or profile control through the operation of the present invention and control apparatus such that any differences in the applied roll force between the left and right ends of the work rolls is initially corrected through the roll leveling control shown in FIGURE 7 and then additionally any gauge control required changes in the applied roll force is compensated for by a corrective bending of the rolls to provide the desired delivery workpiece strip shape.

In the operation of the present control apparatus and as shown in FIGURE 5, an average actual roll force difference signal is compared to an average actual roll bending signal in a predetermined signal ratio circuit 80, for the purpose of correcting the roll bending in a time sequence determined by the operational speed of the rolling mill whenever the actual and measured workpiece strip delivery shape deviates from the desired workpiece strip delivery shape by a predetermined amount.

The necessary transport time delay function required by the remote positions of the X-ray gauges 90 and 92 relative to the rolls is provided by a time delay 99 which senses the ratio correction signal passing through the gate 98 and controls the time sequence device 64 to prevent further changes in the setting of the ratio circuit 80 until previously made changes can be measured to see if they are adequate.

The manner in which the ratio correction signal from the gate 98 changes the ratio setting of the ratio circuit 80 can be understood from FIGURE 6, where there is shown the gate 98 connected through a time gate device 99 for energizing a forward motor control relay 101 for a first polarity ratio correction signal and for energizing a reverse motor control relay 103 for an opposite polarity ratio correction signal. The time gate 99 functions to determine the time interval for the energization of the respective motor control relays in accordance with strip hardness considerations.

In FIGURE 9 there is shown an additional embodiment of the present invention wherein roll bending forces can be applied to increase the effective roll crown and to decrease the effective roll crown in relation to roll force changes away from some predetermined roll force operation of the rolls. In this respect the roll force change signal $\Delta B$ is sensed both above and below the reference roll force signal, as is the change in bending force both above and below the zero bending force at reference roll force operation. For a change in roll force above the reference roll force to give a $\Delta B$ signal having a positive polarity, it is required that the necessary roll bending force signal C also be positive in polarity to satisfy the control function of the signal ratio circuit, and therefore the output control signal from the latter signal ratio circuit within the shape control apparatus 20 will cause the force control device 31 shown in FIGURE 9 to energize the force device 23 to in effect increase the crown of the rolls 10 and 12. On the other hand, for a change in the actual roll force below the reference roll force as applied by screw mechanism 16 through operation of an automatic gauge control system, such as described in AIEE Conference Paper 62–782 entitled "Application of an Outline Computer to Reversing Plate Mills" by A. W. Smith, this will give a $\Delta B$ signal having a negative polarity, and it is now required that the necessary feedback roll bending force signal C also be negative in polarity to satisfy the control function of the signal ratio circuit. In the latter operation, the signal ratio circuit, through suitable diode circuitry, will cause the force control device 31 to energize the force devices 25 and 27 to in effect decrease the crown of the rolls 10 and 12.

In FIGURE 10 there is generally shown the relationship between a conventional automatic gauge control 200 operative to control the operation of the screwdown mechanism 202 for determining the delivery strip gauge from the rolling mill stand 204. A roll force transducer 206 provides an actual roll force signal to the gauge control for sensing the delivered strip gauge or thickness in accordance with the well known mill spring relationship $h = F + So/M$, where F is this roll force signal, So is the screwdown setting and M is a predetermined spring constant. This so determined actual strip thickness is compared with a desired strip thickness to give an error correction difference signal, which is applied to the screwdown mechanism 202 for correction of the strip thickness. The roll force transducer 206 supplies the roll force signal to a roll bending control 208 for comparison with the roll bending signal supplied by the operation of the force device 210, for example through changes of fluid pressure or by direct bending force measurement. In this respect, and as previously described, a desired ratio between roll force change and roll bending force is regulated through correction of the roll bending force through operation of the roll bending control.

It should be understood also that thermal buildup shape errors can be handled by a periodic timing device to zero out such errors.

A recent publication of interest in relation to crown control of rolls was made by M. D. Stone and R. Gray in Sept. 22, 1964 before the Association of Iron and Steel Engineers in Cleveland, Ohio.

Although the present invention has been described with certain degree of particularity, it should be understood that the present disclosure has been made only by way of example that the numerous changes in the details of construction and the combination and arrangement of parts may be resorted to without departing from the scope and spirit of the present invention. For example, the method of workpiece strip shape control taught by this specification can be accomplished by suitable programming of a digital computer operative with roll force and bending force servo control system apparatus.

What is claimed:

1. In apparatus for controlling the shape of a workpiece strip passing between the rolls of a rolling mill, the combination of first force sensing means positioned relative to said rolling mill to sense a first force between said rolls operative with the center of said strip for providing a first control signal in accordance with said first force, second force sensing means positioned relative to said rolling mill to sense a second force between said rolls operative with one edge of said strip for providing a second control signal in accordance with said second force, signal comparison means for providing a third signal in accordance with a predetermined relationship between said first signal and said second signal, and roll force control means responsive to said third signal for applying a workpiece strip shape correction force to said pair of rolls in accordance with said third signal.

2. In apparatus for controlling the shape of the rolls of a rolling mill operative with a workpiece strip, the combination of first force sensing means coupled to said rolling mill to sense a first force between said rolls relative to a first predetermined portion of said strip for providing a first control signal in accordance with said first force, second force sensing means coupled to said rolling mill to sense a second force between said rolls relative to a different predetermined portion of said strip for providing a second control signal in accordance with said second force, signal comparison means for providing a shape control signal in accordance with a predetermined ratio between said first signal and said second signal, and roll force control means responsive to said shape control signal for applying a shape correction force to said rolls in accordance with said shape control signal.

3. In apparatus for controlling the shape of a workpiece strip passing between the rolls of a rolling mill including a screwdown mechanism, the combination of primary roll force sensing means positioned relative to said rolling mill to provide a first control signal in accordance with predetermined changes in the roll force applied by said screwdown mechanism, secondary roll force sensing means positioned relative to said rolling mill for providing a second control signal in accordance with predetermined changes in the bending of said rolls caused by the workpiece strip between said rolls, signal comparison means for providing a third signal in accordance with a predetermined relationship between said first signal and said second signal, and workpiece shape control means responsive to said third signal for applying a correction to said workpiece strip shape through the operation of said pair of rolls in accordance with said third signal.

4. In apparatus for controlling the shape of a workpiece strip passing between the rolls of a rolling mill, the combination of first force sensing means positioned relative to said rolling mill to sense a first force between said rolls at effectively the center of said strip for providing a first control signal in accordance with the deviation of the first force from a reference first force value, second force sensing means positioned relative to said rolling mill to sense a second force between said rolls at effectively one edge of said strip for providing a second control signal in accordance with the deviation of the second force from a reference second force value, signal comparison means for providing a shape control signal in accordance with any change from a predetermined ratio between said first signal and said second signal, and roll force control means responsive to said shape control signal for applying a workpiece strip shape correction force to said pair of rolls in accordance with said shape control signal to vary at least one of said first and second forces as required to remove said change from said predetermined ratio.

5. In apparatus for controlling the shape of a workpiece strip passing between the rolls of a rolling mill the combination of roll leveling means responsive to the respective forces at each end of said rolls for equalizing said forces, firsst force sensing means positioned relative to said rolling mill to sense a first force between said rolls in effect at about the center of said strip for providing a first control signal in accordance with the difference between said first force and a desired first force value, second force sensing means positioned relative to said rolling mill to sense a second force between said rolls in effect at about one edge of said strip and in opposition to said first force for providing a second control signal in accordance with the difference between said second force and a desired second force value, signal comparison means for providing a third signal in accordance with any change in either of said first control signal and said second control signal relative to a predetermined desired relationship between said first signal and said second signal, and roll force control means responsive to said third signal for applying a workpiece strip shape correction force to said pair of rolls in accordance with said third signal as required to again establish said predetermined desired relationship between said first signal and said second signal.

6. In apparatus for controlling the shape of a workpiece strip passing between the rolls of a rolling mill including a screwdown mechanism, the combination of roll leveling means responsive to the respective screwdown forces at the opposite ends of said rolls for equalizing said forces, first force sensing means positioned relative to said rolling mill to sense an actual first force between said rolls applied by said screwdown mechanism at about the edge of said strip for providing a first control signal in accordance with the deviation of the actual first force from a reference first force value, second force sensing means positioned relative to said rolling mill to sense an actual second force between said rolls at about the center of said strip for providing a second control signal in accordance with the deviation of the actual second force from a reference second force value, signal comparison means responsive to said first and second control signals for providing a shape control signal in any duration from a predetermined ratio and desired between said first signal and said second signal, and roll force control means responsive to said shape control signal for applying a workpiece strip shape correction force to said pair of rolls in opposition to said screwdown mechanism and in accordance with said third signal.

7. In apparatus for controlling the shape of a workpiece strip passing between the rolls of a rolling mill, including a screwdown mechanism, the combination of first force sensing means coupled to said rolling mill to sense a first roll bending force applied between said rolls for providing a first control signal in accordance with a predetermined change in said first force, second force sensing means coupled to said rolling mill to sense a second force applied between said rolls by said screwdown mechanism for providing a second control signal in accordance with a predetermined change in said second force, signal comparison means for providing a shape control signal in accordance with a predetermined relationship between said first signal and said second signal, and roll force control means responsive to said shape control signal for applying a workpiece strip shape correction force to said pair of rolls in accordance with said shape control signal.

8. In apparatus for controlling the shape of the rolls of a rolling mill including a screwdown mechanism operative with a workpiece strip, the combination of roll bending means coupled to said rolls for bending the shape of said rolls, first force sensing means coupled to said rolling mill to sense a first force applied between said rolls by said roll bending means for providing a first control signal in accordance with a change in said first force, second force sensing means coupled to said rolling mill to sense a second force applied between said rolls by said screwdown mechanism for providing a second control signal in accordance with a change in said second force, signal comparison means for providing a shape control signal in accordance with a predetermined ratio between said first signal and said second signal, and roll force control means operative with said roll bending means and responsive to said shape control signal for applying a shape correction force to said rolls in accordance with said shape control signal for maintaining said ratio between said first and second signals.

9. The method of controlling the delivery shape of a workpiece delivered from a rolling mill having a screwdown mechanism and including a roll member and roll shape changing means and comprising the steps of sensing the actual roll force applied to the workpiece relative to a reference roll force, generating a first control signal in accordance with any difference between said actual roll force and said reference roll force, sensing the roll shape changing force applied to the workpiece, generating a second control signal in accordance with said roll shape changing force, comparing the actual ratio of said first control signal to said second control signal with a predetermined ratio of said signals to provide a shape control signal, and applying said shape control signal to said roll shape changing means for correcting the shape of said roll member such that said predetermined ratio is realized.

10. The method of controlling the delivery shape of a workpiece from a rolling mill including a pair of rolls and roll shape changing means and comprising the steps of leveling the pair of rolls by sensing the respective forces at the opposite ends of said rolls and equalizing said forces, measuring the actual shape error of the workpiece at a plurality of locations along the workpiece surface in a direction transverse to the movement direction of the workpiece, generating a first control signal in accordance with the actual shape error of the workpiece, measuring the shape error of at least one of said rolls of the rolling mill in accordance with a predetermined force relationship for those rolls, generating a second control signal in accordance with the measured roll shape error, and generating a third control signal in accordance with a predetermined relationship between said first control and said second control signal for correcting the shape of said rolls whenever the first control signal indicates an actual workpiece shape error greater than a predetermined workpiece shape error.

11. The method of controlling the delivery shape of a workpiece delivered from a rolling mill including a roll member and roll shape changing means and comprising the steps of sensing the actual shape error of the workpiece in a direction transverse to the movement direction of the workpiece, generating a first control signal in accordance with the sensed actual shape error of the workpiece, sensing the roll shape error of said roll member of the rolling mill in accordance with a predetermined force relationship for that roll member, generating a second control signal in accordance with the sensed roll shape error of the roll member, and applying the second control signal to said roll shape changing means for correcting the shape of said roll member whenever the first control signal indicates an actual workpiece shape error greater than a predetermined workpiece shape error.

12. The method of controlling the delivery shape of a workpiece delivered from a rolling mill having a screwdown mechanism and including a roll member and roll shape changing means and comprising the steps of sensing the actual roll force applied to the workpiece by said screwdown mechanism relative to a reference roll force, generating a first control signal having a magnitude and a polarity in accordance with the difference between said actual roll force and said reference roll force sensing the roll shape changing force applied to said roll member of the rolling mill by said roll shape changing means, generating a second control signal having a magnitude and a polarity in accordance with said roll shape changing force, comparing the first control signal with the second control signal in predetermined relationship to provide a shape control signal, and applying said shape control signal to said roll shape changing means for correcting the shape of said workpiece in a direction determined by said signal polarities and in a magnitude necessary to maintain said predetermined relationship.

13. The method of controlling the delivery shape of a workpiece delivered from a rolling mill including a roll member and roll shape changing means and comprising the steps of sensing a predetermined change in the roll force applied to the workpiece, generating a first control signal in accordance with any such change in said roll force applied to the workpiece, sensing a predetermined change in roll shape correction force applied to said roll member of the rolling mill, generating a second control signal in accordance with the latter change in the roll shape correction force, generating a shape control signal in accordance with the deviation of said first and second control signals from a predetermined relationship for same, and applying the shape control signal to said roll shape changing means for correcting the shape of said roll member to establish said predetermined relationship.

No references cited.

WILLIAM W. DYER, JR., *Primary Examiner.*

G. A. DOST, *Assistant Examiner.*